United States Patent
Zarate

(10) Patent No.: US 11,985,926 B2
(45) Date of Patent: May 21, 2024

(54) FLEXIBLE WATER DISPENSING RESERVOIR

(71) Applicant: Luis Zarate, Kailua-Kona, HI (US)

(72) Inventor: Luis Zarate, Kailua-Kona, HI (US)

( * ) Notice: Subject to any disclaimer, the term of this patent is extended or adjusted under 35 U.S.C. 154(b) by 205 days.

(21) Appl. No.: 17/729,264

(22) Filed: Apr. 26, 2022

(65) Prior Publication Data

US 2022/0377993 A1 Dec. 1, 2022

Related U.S. Application Data

(60) Provisional application No. 63/193,126, filed on May 26, 2021.

(51) Int. Cl.
*A01G 27/00* (2006.01)
*A01G 25/16* (2006.01)
*A01G 27/02* (2006.01)
*B05B 11/10* (2023.01)

(52) U.S. Cl.
CPC .......... *A01G 27/02* (2013.01); *A01G 25/165* (2013.01); *A01G 27/001* (2013.01); *A01G 27/003* (2013.01); *A01G 27/006* (2013.01); *A01G 27/008* (2013.01); *B05B 11/10* (2023.01)

(58) Field of Classification Search
CPC .... A01G 27/02; A01G 25/165; A01G 27/003; A01G 27/008; A01G 27/006; A01G 27/001; B05B 11/10; B65D 47/32; B65D 2205/00; B65D 2205/02
See application file for complete search history.

(56) References Cited

U.S. PATENT DOCUMENTS

| 3,875,941 | A | * | 4/1975 | Adair | A61M 1/684 141/26 |
| 4,044,836 | A | * | 8/1977 | Martin | B05B 11/041 222/215 |
| 4,456,134 | A | * | 6/1984 | Cooper | B65D 1/0292 215/396 |
| 4,592,492 | A | * | 6/1986 | Tidmore | B65D 1/0292 222/212 |
| 5,301,633 | A | * | 4/1994 | Lloyd | A01K 67/0332 47/79 |
| 5,511,341 | A | * | 4/1996 | Payne | A01G 27/003 47/79 |

(Continued)

*Primary Examiner* — Frederick C Nicolas
(74) *Attorney, Agent, or Firm* — Boudwin Intellectual Property Law, LLC; Daniel Boudwin

(57) ABSTRACT

A flexible water dispensing reservoir is provided. The device includes a flexible reservoir having a first end wall, a second end wall, and a plurality of sidewalls, defining an interior volume. A ventilation aperture and an inlet aperture are disposed through one of the plurality of sidewalls. A plurality of nozzles are disposed on one of the plurality of sidewalls. The ventilation aperture, the inlet aperture, and the plurality of nozzles are in fluid communication with the interior volume. A pump is disposed within the interior volume, wherein the pump is operably connected to the plurality of nozzles. When the pump is actuated, fluid disposed within the interior volume is dispensed through at least one of the plurality of nozzles. In some embodiments, a controller housing is in communication with the plurality of nozzles via a wireless transceiver, wherein the plurality of nozzles dispense fluid according to a programmed schedule.

20 Claims, 4 Drawing Sheets

(56) References Cited

U.S. PATENT DOCUMENTS

| | | | | |
|---|---|---|---|---|
| 5,562,221 A * | 10/1996 | Beniacar | B65D 1/0292 | 220/666 |
| 5,667,101 A * | 9/1997 | Barrash | B65D 25/465 | 222/481.5 |
| 5,921,445 A * | 7/1999 | Schmitz | B67D 1/02 | 222/626 |
| 5,979,326 A * | 11/1999 | Ohinata | B41J 2/1752 | 220/666 |
| 6,023,883 A * | 2/2000 | Bacon, Jr. | A01G 25/02 | 47/48.5 |
| 6,047,848 A * | 4/2000 | Davis | B65D 1/0292 | 220/666 |
| 6,056,166 A * | 5/2000 | Schmitz | B67D 1/02 | 222/626 |
| 6,264,120 B1 * | 7/2001 | Wintering | B05B 11/1001 | 222/175 |
| 6,431,406 B1 * | 8/2002 | Pruett | B65D 1/0292 | 220/666 |
| 7,118,050 B1 * | 10/2006 | Chen | B05B 9/0861 | 239/375 |
| 9,968,038 B2 * | 5/2018 | Alassadi | A01G 27/02 | |
| 10,206,468 B2 * | 2/2019 | Luo | A45C 7/0036 | |
| 11,332,273 B2 * | 5/2022 | Hom | B65D 23/0842 | |
| 2004/0065696 A1 * | 4/2004 | Fletcher | B65D 47/0838 | 222/562 |
| 2007/0290004 A1 * | 12/2007 | Lee | B01L 3/0293 | 422/63 |
| 2014/0283445 A1 * | 9/2014 | Chabot | A01G 29/00 | 47/48.5 |
| 2016/0192603 A1 * | 7/2016 | Chen | E03F 9/005 | 47/81 |

\* cited by examiner

FLEXIBLE WATER DISPENSING RESERVOIR

CROSS REFERENCE TO RELATED APPLICATIONS

This application claims the benefit of U.S. Provisional Application No. 63/193,126 filed on May 26, 2021. The above identified patent application is herein incorporated by reference in its entirety to provide continuity of disclosure.

BACKGROUND OF THE INVENTION

The present invention relates to a water dispensing reservoir. More particularly, the present invention pertains to a flexible water dispensing reservoir configured to bend, expand, or contract to fit within a pot, planter, or other receptacle.

Many individuals keep plants indoors, whether for ambience in their home, or in order to protect the plants from inclement weather that would otherwise damage them outdoors. In order to maintain and ensure proper plant growth, regular watering must be performed to keep the plants properly hydrated and healthy. Failing to provide sufficient and regular watering can result in inhibited plant growth, undesirable or unattractive wilting, or even plant death. However, manually watering several plants throughout a home can be time consuming, frustrating, and can often lead to one or more plants being missed. Alternatively, gravity feed watering bulbs are often used to provide a regular supply of water, however, such bulbs may not suit a user's aesthetic preferences, and fail to provide consistent and regular watering at a desired time, instead relying on soil moisture and gravity to gradually replenish water within the soil. As such watering bulbs provide extremely localized watering, a user may be required to use multiple watering bulbs for large volume plant pots to ensure that the plant's root system is properly hydrated. Therefore, a device that can adjustably secure within an existing plant pot of various size to automatically provide regular water to an entirety of the plant's root system is desired.

In light of the devices disclosed in the known art, it is submitted that the present invention substantially diverges in design elements from the known art and consequently it is clear that there is a need in the art for an improvement to existing water dispensing reservoir. In this regard, the instant invention substantially fulfills these needs.

SUMMARY OF THE INVENTION

In view of the foregoing disadvantages inherent in the known types of water dispensing reservoirs now present in the known art, the present invention provides a flexible water dispensing reservoir wherein the same can be utilized for providing convenience for the user when conforming a water dispensing reservoir to the shape and size of a particular plant receptacle to passively water a plant as desired.

The present system comprises a flexible reservoir having a first end wall, a second end wall, and a plurality of sidewalls defining an interior volume therebetween. A ventilation aperture is disposed through one of the plurality of sidewalls. An inlet aperture is disposed through one of the plurality of sidewalls. A plurality of nozzles are disposed on one of the plurality of sidewalls, wherein each of the ventilation aperture, inlet aperture, and the plurality of nozzles are in fluid communication with the interior volume. A pump is disposed within the interior volume, wherein the pump is operably connected to each of the plurality of nozzles, such that when the pump is actuated, fluid disposed within the interior volume is dispensed through at least one of the plurality of nozzles. In some embodiments, controller housing is in communication with the plurality of nozzles via a wireless transceiver, wherein the plurality of nozzles are configured to actuate upon receipt of an actuation signal via the controller housing. In such embodiments, the actuation signal is generated by a processor within the controller housing corresponding to a programmed schedule.

In some embodiments, the plurality of sidewalls comprise a plurality of pleats therein defining an accordion configuration. In another embodiment, the first end wall includes a connector thereon, wherein the connector is configured to frictionally engage within a recess defined within the second end wall to removably secure the first end wall to the second end wall. In other embodiments, the connector comprises a plurality of ridges thereon, the plurality of ridges corresponding to a plurality of grooves defined within the recess. In yet another embodiment, a cap is removably securable to the inlet aperture. In some embodiments, the inlet aperture and the ventilation aperture are disposed on a sidewall adjacent to the sidewall containing the plurality of nozzles. In another embodiment, the plurality of nozzles are disposed at regular intervals along a length of the flexible reservoir. In other embodiments, the programmed schedule includes a time and duration of activation for one or more nozzles of the plurality of nozzles. In yet another embodiment, the controller housing includes a keypad, a dial, and a display disposed on a front face of the controller housing. In some embodiments, the controller housing includes a base, a rear wall, and a front face, wherein the rear wall is orthogonal to the base, and the front face extends between the rear wall and the base at an angle relative to the base. In another embodiment, a control is disposed on the flexible reservoir, wherein the control activates the pump when actuated.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
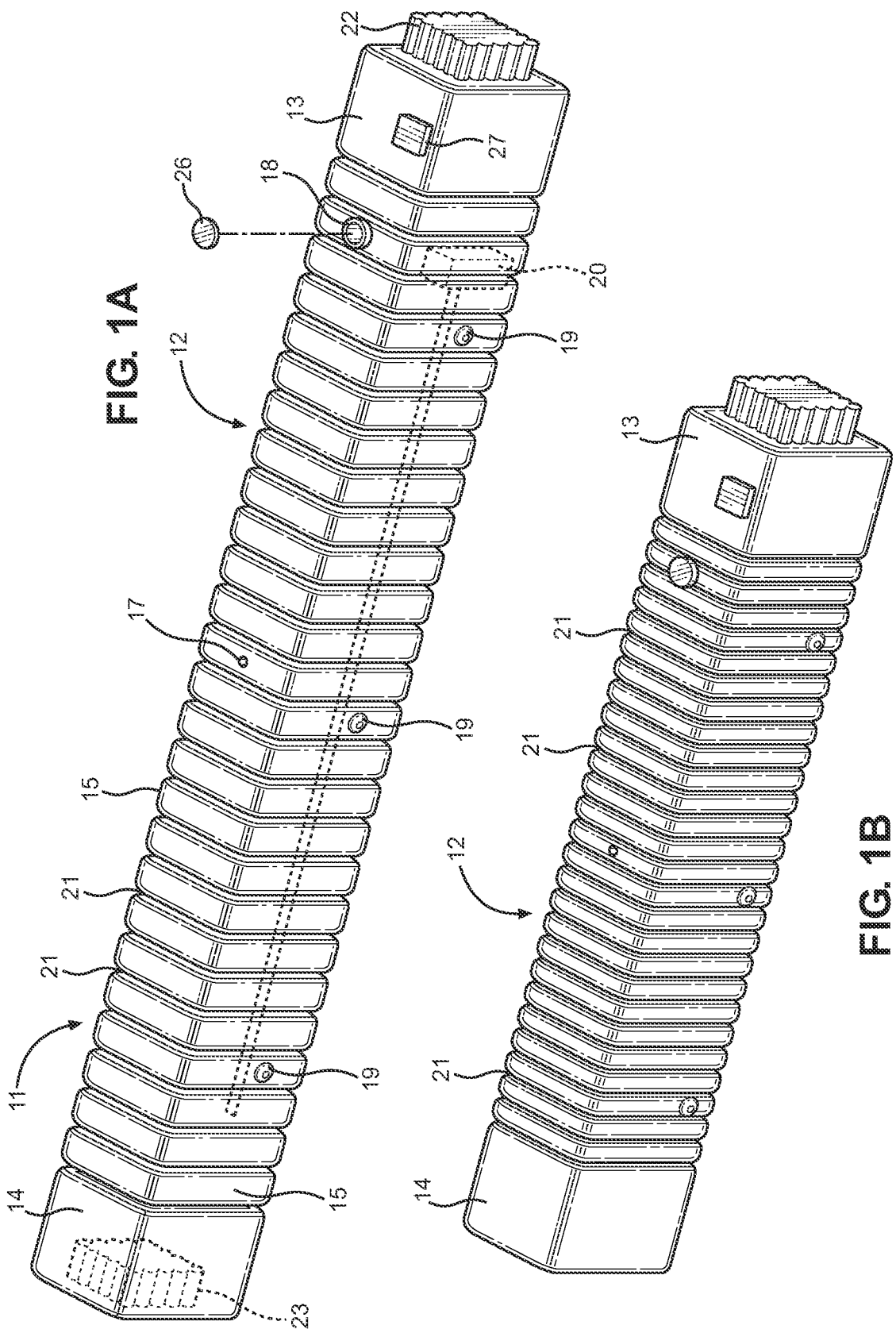
FIG. 1A shows a perspective view of an embodiment of the flexible water dispensing reservoir in an extended position.
FIG. 1B shows a perspective view of an embodiment of the flexible water dispensing reservoir in a contracted position.

Reference is made herein to the attached drawings. Like reference numerals are used throughout the drawings to depict like or similar elements of the flexible water dispensing reservoir. The figures are intended for representative purposes only and should not be considered to be limiting in any respect.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

In the interests of economy, the present disclosure refers to "a computer-readable medium," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

As referred to herein, the term "electronic device" refers to any computing device that includes at least a display screen and an input mechanism. The computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such computing devices can also combine custom hard-wired logic, ASICs, or FPGAs with custom programming to accomplish the technique and other features of the present disclosure. The computing devices can be desktop computer systems, laptops, cell phones, tablets, networking devices, or any other device that incorporates hard-wired and/or program logic to implement the techniques and other features of the present disclosure.

Figure 5:
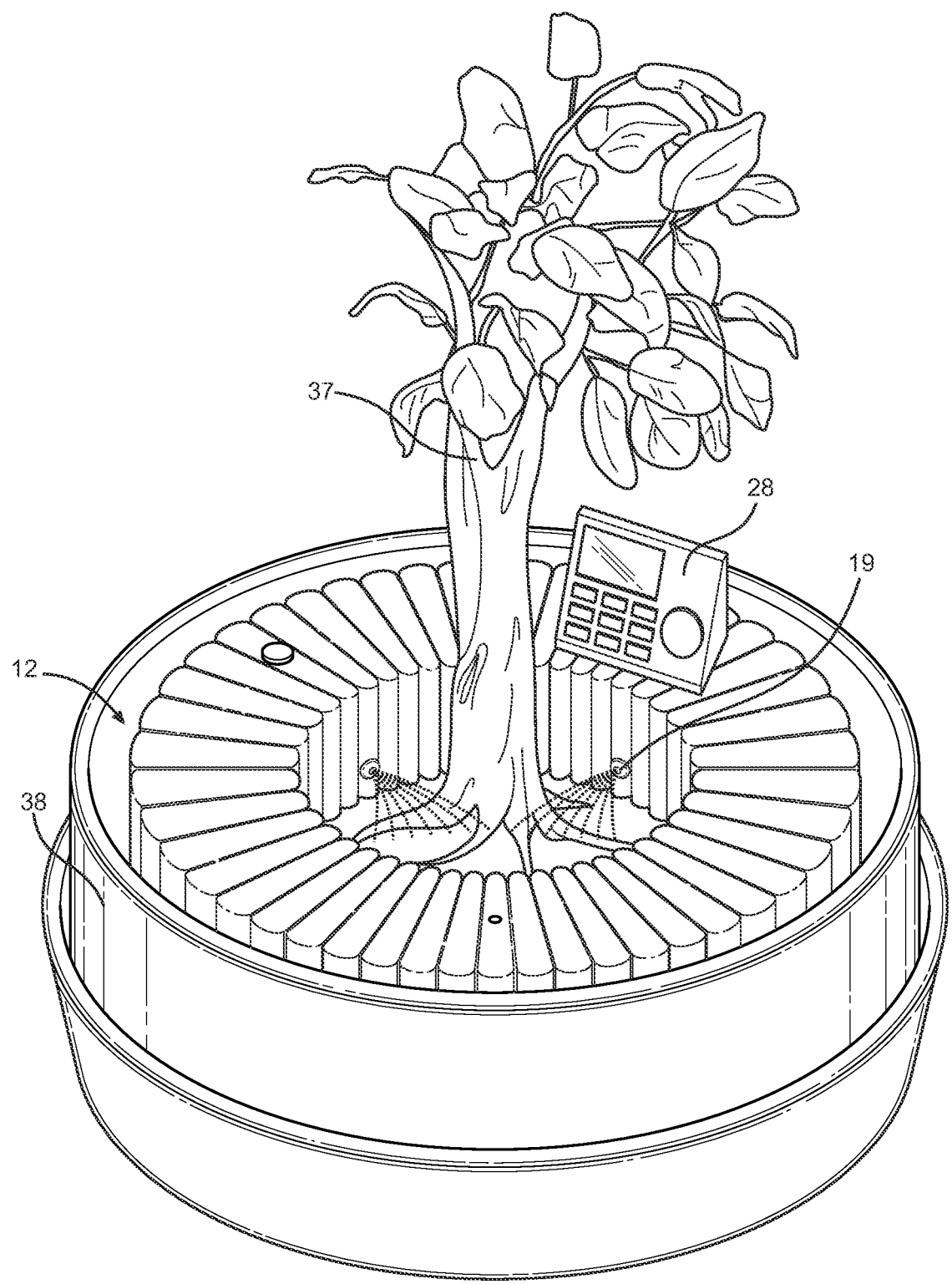
FIG. 5 shows a perspective view of an embodiment of the flexible water dispensing reservoir in use.

Referring now to FIGS. 1A and 1B, there is shown a perspective view of an embodiment of the flexible water dispensing reservoir in an extended position and a perspective view of an embodiment of the flexible water dispensing reservoir in a contracted position, respectively. The flexible water dispensing reservoir 11 comprises a flexible reservoir 12 having a first end wall 13 opposite a second end wall 14 and a plurality of sidewalls 15 defining an interior volume therebetween. In the shown embodiment, the plurality of sidewalls 15 comprise a plurality of pleats 21 thereon, wherein the plurality of pleats 21 define an accordion configuration to facilitate flexibility of the flexible housing 12, thereby allowing the user to selectively bend the flexible housing 12 along the plurality of pleats 21 to secure within plant receptacles of various shapes and sizes. Similarly, the accordion configuration provides the capability of adjust a relative length of the flexible housing 12 between an extended position (as shown in FIG. 1A) and a contracted position (as shown in FIG. 1B). In this manner, the flexible housing 12 can be further adjusted to fit within various plant receptacles. In the illustrated embodiment, a connector 22 is disposed on the first end wall 13, wherein the connector 22 is contemplated to removably secure within a recess 23 disposed within the second end wall 14. In this manner, the flexible housing 12 can be retained in a circular configuration (as shown in FIG. 5) or used in combination with additional flexible water dispensing reservoir 11 units to coordinate watering of larger planter systems in a variety of configurations.

In the illustrated embodiment, a ventilation aperture 17 is disposed on a sidewall of the plurality of sidewalls 15, wherein the ventilation aperture 17 equalizes the pressure within the interior volume within the surrounding area to facilitate dispensing of fluid from the flexible housing 12. Furthermore, an inlet aperture is disposed on a sidewall of the plurality of sidewalls 15, wherein the inlet aperture 18 provides access to the interior volume, such that a user can refill the flexible reservoir 12 via the inlet aperture 18. In the shown embodiment, a cap 26 is removably securable to the inlet aperture 18, wherein the cap 26 retains the fluid within the interior volume. In some embodiments, the cap 26 removably secures via frictional engagement, however, in alternate embodiments, the cap 26 further comprises threading thereon to engage complementary threading of the inlet aperture 18. In this manner, a watertight seal can be formed between the inlet aperture 18 and the cap 26, thereby ensuring the fluid within the interior volume does not leak therefrom. In the shown embodiment, the ventilation and inlet apertures 17, 18 are disposed along a same sidewall of the plurality of sidewalls 15, contemplated to be disposed along an upper side thereof in use to ensure operation and accessibility.

Figure 3:
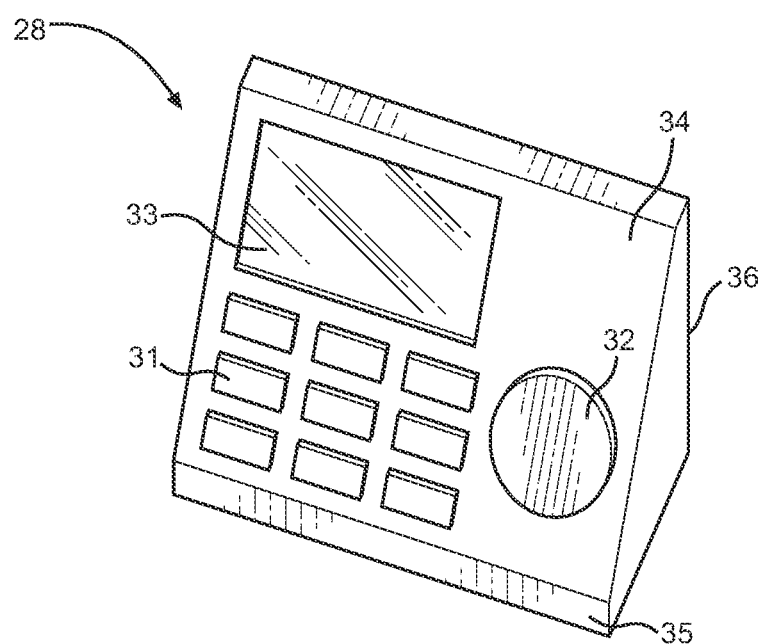
FIG. 3 shows a perspective view of the controller housing of an embodiment of the flexible water dispensing reservoir.

A plurality of nozzles 19 are disposed along a sidewall of the plurality of sidewalls 15, wherein the plurality of nozzles 19 are in fluid communication with the interior volume. In the shown embodiment, the plurality of nozzles 19 are disposed linearly along a single sidewall of the plurality of sidewalls 15 at regular intervals, such that the direction of expelled fluid can be oriented along a single side of the flexible reservoir 12. Additionally, the regular placement of the plurality of nozzles 19 along the sidewall ensures even distribution of water across the entire planter area. In this manner, the flexible reservoir 12 can be placed within a plant pot, planter, or other receptacle, such that the plurality of nozzles 19 are oriented towards the plant to be watered. Similarly, in the illustrated embodiment, the plurality of nozzles 19 are disposed along a sidewall adjacent to the sidewall containing the ventilation and inlet apertures 17, 18. In this manner, the flexible reservoir 12 can be placed within the planter such that the ventilation and inlet apertures 17, 18 are facing upwards relative to the planter providing access thereto, while exposing the plurality of nozzles 19 for dispensing fluid into the planter. A pump 20 is disposed within the interior volume, whereupon actuation of the pump 20, the fluid within the interior volume is transported through flexible tubing extending along the plurality of nozzles 19 to be dispensed therefrom. In the shown embodiment, the pump 20 is disposed proximate to the first end wall 13 to minimize interference with the flexibility of the flexible housing 12, however, the pump 20 is contemplated to be secured proximate to the second end wall 14, or elsewhere within the interior volume to ensure the flexible housing 12 can be adjusted as desired. In the illustrated embodiment, a control 27 is disposed on the flexible housing 12 and is operably connected to the pump 20, such that upon actuation of the control 27, the pump 20 is activated to dispense fluid from the interior volume through one or more of the plurality of nozzles 19. Alternatively, as elsewhere described herein, a separate controller housing (as shown in FIG. 3, 28) is in operably communication with the pump 20, such that the user can selectively actuate the pump 20 via remote inputs from the controller housing. In some such embodiments, the plurality of nozzles 19 can be independently activated to allow the user to adjust a volume and spread of fluid dispensed therefrom as desired.

Figure 2:
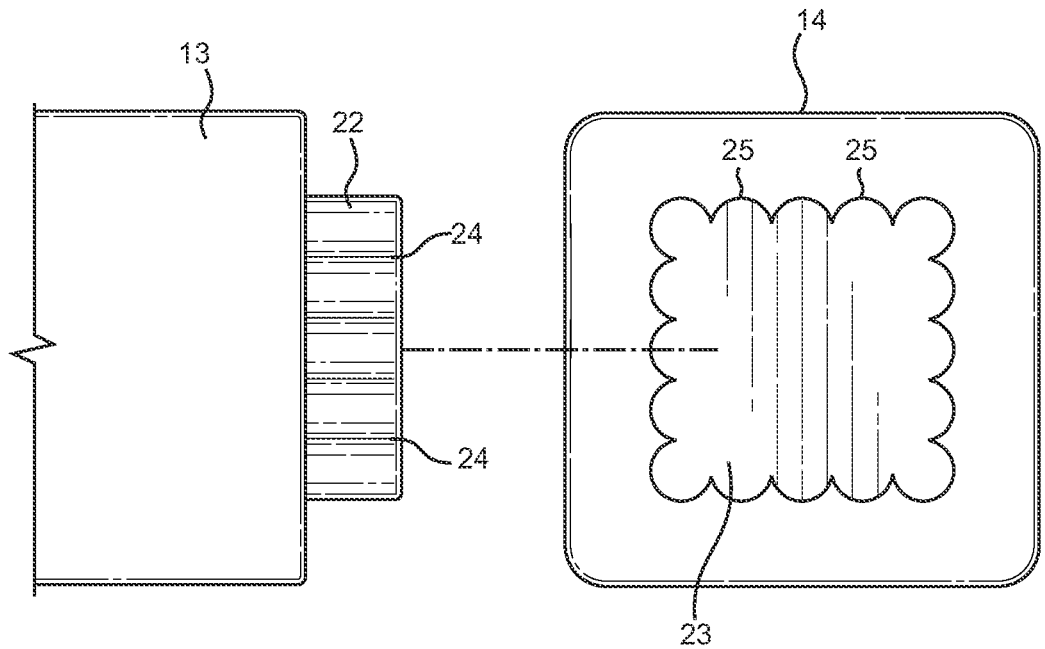
FIG. 2 shows an exploded view of the connector and recess interface of an embodiment of the flexible water dispensing reservoir.

Referring now to FIG. 2, there is shown an exploded view of the connector and recess interface of an embodiment of the flexible water dispensing reservoir. In the shown embodiment, the connector 22 disposed on the first end wall 13 of a flexible water dispensing reservoir removably secures within an associated recess 23 disposed on the second end wall 14 of the same or another flexible water dispensing reservoir as desired. The connector 22 is contemplated to frictionally engage the recess 23 to retain the first end wall 13 in contact with the second end wall 14 during use to maintain a desired deployment configuration. Furthermore, in the illustrated embodiment, the connector 22 comprises a plurality of ridges 24 along an exterior surface thereof, wherein the plurality of ridges 24 frictionally engage within corresponding grooves of a plurality of grooves 25 disposed along an interior surface of the recess 23. In this manner, the plurality of ridges 24 and the plurality of grooves 25 increase the surface area in contact between the connector 22 and the recess 23, thereby strengthening the frictional engagement provided thereby. In some embodiments, the plurality of ridges 24 comprise a convex upper side configured to engage within a concavity defined by each of the plurality of grooves 25.

Referring now to FIG. 3, there is shown a perspective view of the controller housing of an embodiment of the flexible water dispensing reservoir. In the illustrated embodiment, a controller housing 28 is operably connected to one or more flexible water dispensing reservoirs, wherein the controller housing 28 is in wireless communication with the pump of each unit, to selectively input commands to dispense fluid from the flexible reservoir as desired. In the shown embodiment, the controller housing 28 comprises a base 35, a rear wall 36 extending orthogonally from a rear edge of the base 35, and a front face 34 extending between an upper end of the rear wall 36 and a front edge of the base 35, such that the front face 34 is disposed at an acute angle relative to the base 35. One or more input mechanisms are disposed on the front face 34 configured to program and select a desired watering schedule, wherein the watering schedule comprises a time of activation, duration of activation, and frequency of activation. In this manner, the user can ensure that automatic and regular watering of a plant is maintained. In the shown embodiment, the input mechanisms include a keypad 31 and a dial 32, such that the user can type and select prompts on a graphical user interface, respectively, wherein the graphical user interface is displayed on a display 33 disposed on the front face 34. In some embodiments, a fastener is disposed on a lower surface of the base 35, such that the controller housing 28 is removably securable to a complementary fastener disposed on the flexible reservoir. In this manner, the controller housing 28 can be retained in close proximity to the flexible reservoir to ensure the controller housing 28 is not misplaced. In some embodiments, the controller housing 28 further communicates with a water level sensor disposed within the flexible reservoir, such that a warning can be displayed on the display 33 to inform the user that the flexible reservoir needs to be refilled.

Figure 4:
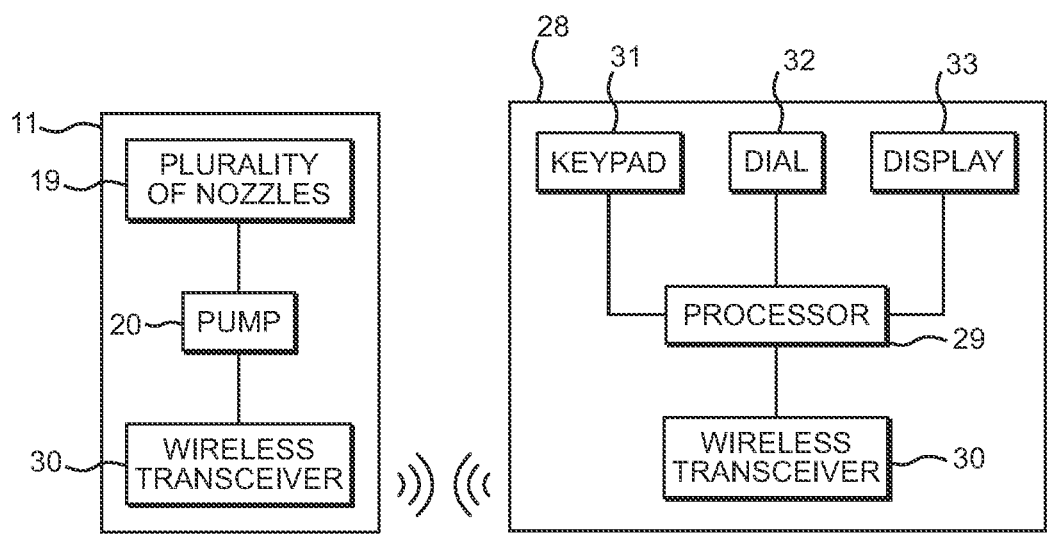
FIG. 4 shows a schematic view of an embodiment of the flexible water dispensing reservoir.

Referring now to FIG. 4, there is shown a schematic view of an embodiment of the flexible water dispensing reservoir. In the shown embodiment, the controller housing 28 is in wireless communication with the flexible water dispensing reservoir 11 via a pair of wireless transceivers 30 disposed within each respective device. A processor 29 is operably connected to the wireless transceiver 30 and each of the keypad 31, dial 32, and the display 33, such that the user can selectively program and select one or more desired watering schedules into the processor 29 to be automatically enacted. At a designated time, and for a designated duration associated with the selected watering schedule, the pump 20 is actuated upon receipt of an actuation signal transmitted from the controller housing 28. Once actuation, the pump 20 dispenses fluid from the interior volume through one or more of the plurality of nozzles 19. In this manner, the user can selectively maintain a desired watering schedule for a plant around which the flexible water dispensing reservoir 11 is placed.

Referring now to FIG. 5, there is shown a perspective view of an embodiment of the flexible water dispensing reservoir in use. In one use, the flexible reservoir 12 is adjusted to fit within a desired planter, pot, or other plant receptacle 38. In the shown embodiment, a single flexible reservoir 12 is secured together in a circular configuration to conform to the shape of the plant receptacle 38, however a linear, curved, or other configuration suited for the shape and size of the plant receptacle 38 can similarly be utilized. Furthermore, additional flexible reservoirs 12 can be secured together sequentially and paired with a single controller housing 28, such that each of the multiple flexible reservoirs 12 simultaneously activate following a single watering schedule as provided. In the shown embodiment, the flexible reservoir 12 is oriented such that each of the plurality of nozzles 19 faces an interior side of the plant receptacle 38 such that each of the plurality of nozzles 19 are oriented towards the plant 37. Once the flexible reservoir 12 nears empty, an alert may be sent to the controller housing 28 to inform the user to refill the flexible reservoir 12 via the inlet aperture. In this manner, the user can ensure that the plant 37 receives regular and consistent watering with minimal required user interaction.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A flexible water dispensing reservoir, comprising:
   a flexible reservoir having a first end wall, a second end wall, and a plurality of sidewalls, defining an interior volume therebetween;
   a ventilation aperture disposed through one of the plurality of sidewalls;

an inlet aperture disposed through one of the plurality of sidewalls;
a plurality of nozzles disposed on one of the plurality of sidewalls;
wherein each of the ventilation aperture, the inlet aperture, and the plurality of nozzles are in fluid communication with the interior volume;
a pump disposed within the interior volume, the pump operably connected to each of the plurality of nozzles, such that when the pump is actuated, fluid disposed within the interior volume is dispensed through at least one of the plurality of nozzles.

2. The flexible water dispensing reservoir of claim 1, wherein the plurality of sidewalls comprise a plurality of pleats therein defining an accordion configuration.

3. The flexible water dispensing reservoir of claim 1, wherein the first end wall includes a connector thereon, wherein the connector is configured to frictionally engage within a recess defined within the second end wall to removably secure the first end wall to the second end wall.

4. The flexible water dispensing reservoir of claim 3, wherein the connector comprises a plurality of ridges thereon, the plurality of ridges corresponding to a plurality of grooves defined within the recess.

5. The flexible water dispensing reservoir of claim 1, further comprising a cap removably securable to the inlet aperture.

6. The flexible water dispensing reservoir of claim 1, wherein the inlet aperture and the ventilation aperture are disposed on a sidewall adjacent to the sidewall containing the plurality of nozzles.

7. The flexible water dispensing reservoir of claim 1, wherein the plurality of nozzles are disposed at regular intervals along a length of the flexible reservoir.

8. The flexible water dispensing reservoir of claim 1, wherein the plurality of nozzles are disposed on a single sidewall of the plurality of sidewalls.

9. The flexible water dispensing reservoir of claim 1, a control disposed on the flexible reservoir, wherein the control activates the pump when actuated.

10. A flexible water dispensing reservoir, comprising:
a flexible reservoir having a first end wall, a second end wall, and a plurality of sidewalls, defining an interior volume therebetween;
a ventilation aperture disposed through one of the plurality of sidewalls;
an inlet aperture disposed through one of the plurality of sidewalls;
a plurality of nozzles disposed on one of the plurality of sidewalls;
wherein each of the ventilation aperture, the inlet aperture, and the plurality of nozzles are in fluid communication with the interior volume;
a pump disposed within the interior volume, the pump operably connected to each of the plurality of nozzles, such that when the pump is actuated, fluid disposed within the interior volume is dispensed through at least one of the plurality of nozzles;
a controller housing in communication with the plurality of nozzles via a wireless transceiver;
wherein the plurality of nozzles are configured to actuate upon receipt of an actuation signal via the controller housing;
wherein the actuation signal is generated by a processor within the controller housing corresponding to a programmed schedule.

11. The flexible water dispensing reservoir of claim 10, wherein the plurality of sidewalls comprise a plurality of pleats therein defining an accordion configuration.

12. The flexible water dispensing reservoir of claim 10, wherein the first end wall includes a connector thereon, wherein the connector is configured to frictionally engage within a recess defined within the second end wall to removably secure the first end wall to the second end wall.

13. The flexible water dispensing reservoir of claim 12, wherein the connector comprises a plurality of ridges thereon, the plurality of ridges corresponding to a plurality of grooves defined within the recess.

14. The flexible water dispensing reservoir of claim 10, further comprising a cap removably securable to the inlet aperture.

15. The flexible water dispensing reservoir of claim 10, wherein the inlet aperture and the ventilation aperture are disposed on a sidewall adjacent to the sidewall containing the plurality of nozzles.

16. The flexible water dispensing reservoir of claim 10, wherein the plurality of nozzles are disposed at regular intervals along a length of the flexible reservoir.

17. The flexible water dispensing reservoir of claim 10, wherein the plurality of nozzles are disposed on a single sidewall of the plurality of sidewalls.

18. The flexible water dispensing reservoir of claim 10, wherein the programmed schedule includes a time and duration of activation for one or more nozzles of the plurality of nozzles.

19. The flexible water dispensing reservoir of claim 10, wherein the controller housing includes a keypad, a dial, and a display disposed on a front face of the controller housing.

20. The flexible water dispensing reservoir of claim 10, wherein the controller housing includes a base, a rear wall, and a front face, wherein the rear wall is orthogonal to the base, and the front face extends between the rear wall and the base at an angle relative to the base.

\* \* \* \* \*